United States Patent Office 3,434,498
Patented Mar. 25, 1969

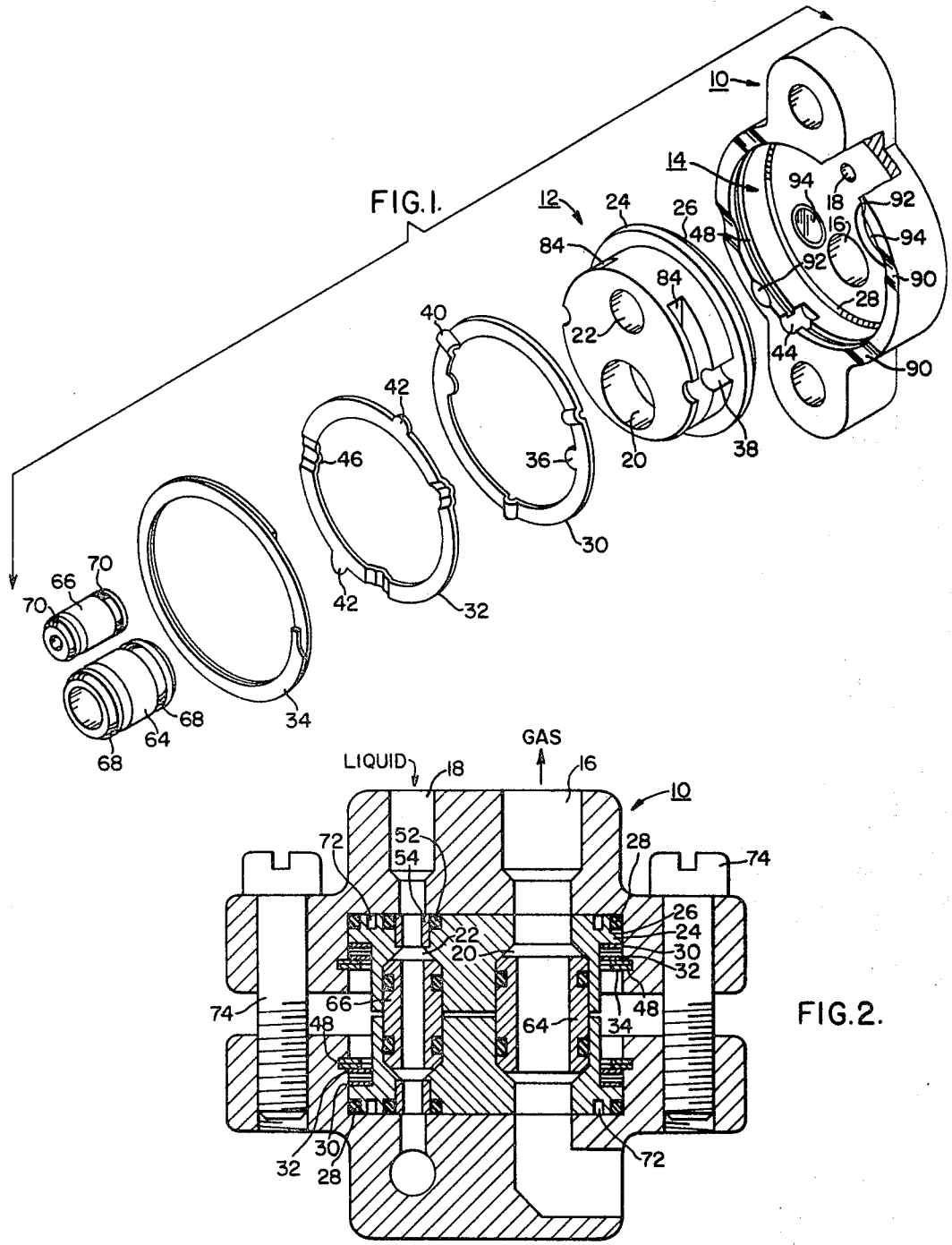

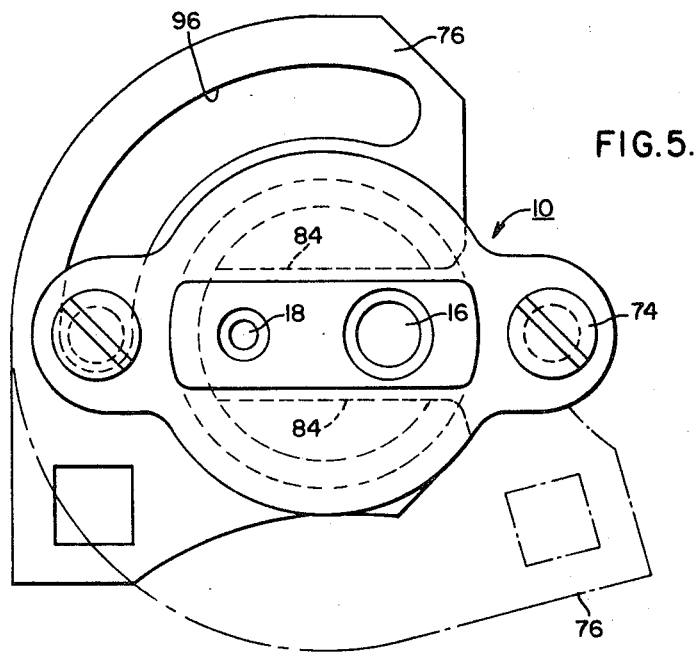
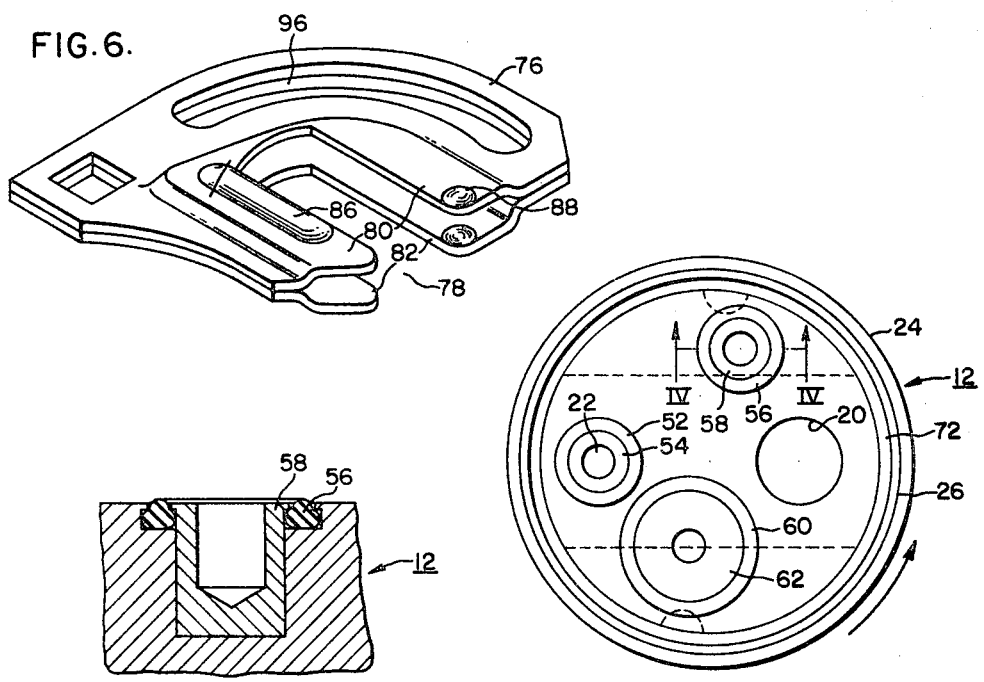

3,434,498
DUAL-PASSAGE LINE-BREAKING VALVE
Arthur H. Eberhart, Hilliard, Ohio, assignor to Westinghouse Electric Corporation, Pittsburgh, Pa., a corporation of Pennsylvania
Filed Jan. 30, 1967, Ser. No. 612,480
Int. Cl. F16k 43/00; F16l 21/02
U.S. Cl. 137—625.18          9 Claims

ABSTRACT OF THE DISCLOSURE

This invention relates to the structure of a dual-line shut-off valve in which mirror image halves of the valve each contain a rotor which in one position provides through passages, and in an opposite position closes the passages and permits separation of the valve halves without a significant loss of fluid under a pressure or vacuum condition in the lines. The rotors are held in the respective valve halves by a retention and cam ring assembly which urges the rotor into a tightly sealed condition in the opposite valve positions, but which also permits a limited release for travel between the opposite positions. The valve handle also cooperates under a vacuum condition in insuring a release of the tight seal.

---

A valve according to the invention is intended to find its main use in split refrigeration systems, for example, although it will be apparent from the following description that the valve may be used in other ways as well. In a split refrigeration system, the refrigeration lines leading to and from the remotely located condensing unit are sometimes required to be disconnected from the remainder of the system for repair or maintenance of either the condenser or the other system components. It is, of course, desirable that the disconnection and subsequent reconnection take place without the loss of refrigerant charge. Single so-called quick disconnect valves are sometimes provided in the individual refrigerant lines but, as a rule, they are relatively heavy, expensive devices which also possess other disadvantages. It would be preferable in most inmost instances to employ a valve which would permit the disconnection of both lines simultaneously.

Additionally, it is desirable that such a valve be relatively compact to fit in restricted size spaces, and be of a character which permits it to be connected to the refrigerant lines by brazing or other heat generating operations without adversely affecting the non-metallic sealing components of the valve.

Accordingly, an object of this invention is the provision of a valve which possesses these characteristics as well as other desirable characteristics to be noted hereinafter.

In accordance with the invention, I provide a dual-passage rotary valve comprised of opposite, substantially mirror image halves arranged in mirror image relation and which may be separated from each other when the valve is in a closed position sealing the ends of each refrigerant line connected to the valve. The main parts of each opposite half of the valve include a housing having a rotor chamber with dual passages opening to the rotor chamber, and a rotor for the chamber. The rotor has dual passages registering with the housing passages in an open position of the valve, and out of registry in a closed position. Means are provided to hold the rotor to the housing and urge it axially into the chamber. Thrust seals disposed generally in the interface plane of the housing-to-rotor passages place at least selected ones of the passages in sealed communication in an open position of the valve and obstruct the housing passages at the interface plane in a closed position of the valve. Means are provided to urge the rotor more tightly into the chamber in both the open and closed positions of the valve than at intermediate positions. Accordingly, the thrust seals are partially relieved from heavy friction when the valve is being moved between the opposite positions, and back-up seal means encompassing all of the thrust seals prevents any slight leakage at the housing passage ports from escaping out of the chamber.

Means connecting the pairs of passages in the opposite rotors in releasably sealed relation may be provided in the form of a pair of sleeves having opposite end portions seating in the respectively opposite rotors and provided with circumferential seals on the opposite end portions. When the opposite housings are to be separated (to break the lines) in a closed position of the valve, the external means normally clamping the opposite housings together in an open position of the valve are released, and the opposite housings may be pulled apart with their respective rotors accompanying them, and with the separation of the passages in the opposite rotors taking place through a portion of each of the rotor sleeves being unseated from its rotor.

The invention will be further described in connection with the accompanying drawing, illustrating a currently preferred embodiment thereof by way of example, and wherein:

FIGURE 1 is an exploded isometric view of substantially one half of the valve;

FIG. 2 is a vertical sectional view through the valve in an open position, with the operating handle omitted for clarity;

FIG. 3 is a view of the end face of one of the rotors;

FIG. 4 is a sectional view corresponding to one taken along the line IV—IV of FIG. 3;

FIG. 5 is a top view of the valve with the operating handle shown in a valve-open position in solid lines, and in a valve-closed position in dash lines; and FIG. 6 is an isometric view of the operating handle removed from the valve.

Referring to FIGS. 1 and 2, the main parts of each half of the valve are a housing 10 and a rotor 12. The housing includes a generally right cylindrical chamber 14 into which the rotor 12 seats. The housing passages 16 and 18 to which the gas and liquid refrigerant lines, respectively, are connected open into the chamber 14, and in the embodiment shown have counterbores to receive the external refrigerant lines for a brazed connection.

The rotor 12 is a relatively thick, generally circular member provided with a pair of passages 20 and 22 parallel to the axis of the rotor and located so as to be in registry with the housing passages when the valve is in an open position. A circumferential flange 24 near the rotor end face defines an annular seat 26 for the back-up seal 28 shown in place in the corner of the housing chamber of FIG. 1.

The means for retaining the rotor 12 in the chamber 14 include a rotor ring 30, a housing ring 32, and a helical retention ring 34. The rotor ring is a generally flat steel member with opposite, inwardly-projecting ears 36 which seat in the rotor keyways 38 on opposite sides of the rotor and cause the ring to rotate with the rotor. The rotor ring has three circumferentially-spaced embossments 40 on its face directed away from the chamber.

The housing ring 32 includes a pair of opposite, outwardly-directed ears 42 which seat in oppositely disposed housing keyways 44 provided in the circumferential wall of the chamber 14 and prevent ring rotation. The housing ring is also provided with three circumferentially-spaced embossments 46 facing the embossments of the rotor ring 30. The facing embossments on the rotor ring and housing ring register generally with each other when the value is both an open and a closed position for urging the rotors axially more tightly into their respective chambers. The length of the housing ring embossments extends through a greater arc than the rotor ring embossments and have a raised center portion as shown in exaggerated form in FIG. 1. Thus when the embossments are moved into registry with each other, those on the rotor ring ride up onto a plateau on one side or the other of the central portion of the housing ring embossments 46 depending upon whether the valve is being opened or closed.

In assembling the main parts of the valve half of FIG. 1, the rotor 12 is first placed in the chamber 14 with the rotor ring 30 fitted onto the rotor circumference, then the housing ring 32 is inserted with its ears indexed in the housing keyways, and finally the helical retaining ring 34 is compressed diametrically and inserted in the chamber until it reaches its grooved seat 48 in the side walls of the chamber and springs out thereinto. This seat for the retention ring is spaced from the planar end face of the chamber such that the rings 30 and 32 are accommodated between ring 34 and annular flange 24 with relatively light axis thrust being imposed upon the rotor when the ring bosses 40 and 46 are out of registry. However the two rings 30 and 32 function as cam means which increases this axial thrust substantially when the embossments are in registry with each other.

The thrust sealing means for placing aligned passages in sealed communication, and for sealing the passages in the housing against leakage into the rotor chamber when the valve is closed, are best seen in FIGS. 2-4. In the currently preferred embodiment, small O-rings having an inner diameter larger than the diameter of the passage with which they are associated are held in recessed fashion at the end faces of the rotors so as to partly lie in the interface plane at the rotor-chamber end faces. To so hold the O-rings, stepped bores are provided to accommodate sleeve-shaped glands which define the inner circumferences of the circular seats in which the O-rings are received. The thrust seal for the liquid passage includes an O-ring 52 held in place by the hollow, open-end gland 54. The blocking thrust seal for the liquid passage includes the O-ring 56 and the closed-end gland 58. The blocking seal for the gas passage includes a somewhat larger O-ring 60 and correspondingly larger closed-end gland 62.

FIGURE 4 illustrates the preferred arrangement for holding the O-rings in their seats by providing undercuts on rotor face and gland rims to insure retention of the O-rings during movement of the rotor relative to the housing. It will be appreciated that the provision of the separate glands for defining the O-ring seats is illustrative only of one way of accommodating the thrust seals with simplified rotor machining.

The end face of the rotor encompassing the gas passage 20 port is not shown with a thrust seal. If it is contemplated that such a thrust seal would be needed, one similar to those described may be provided. However, where the valve is designed for a split refrigeration system, the need for sealing the gas passage connections between the rotor and housing when the valve is open is deemed unnecessary since the liquid passage thrust seal prevents the short circuiting of the separate fluid passages, and the leakage of gas from the rotor and housing chamber is prevented by the back-up seal 28 and rotor connector seal means to be later described.

The rotor shown in FIGURE 3 may be taken as the rotor in the top half of the valve for purposes of describing how the rotor serves in the open and closed positions of the valve. It is noted that "open" and "closed" refer to the valve passages rather than separation of the halves of the valve. As shown, the liquid passage 22 and the gas passage 20 have their axes on diametrically opposite sides of the axis of rotation of the rotor. Correspondingly, the blocking seal axes are diametrically opposite each other. It is assumed that the rotor as shown in FIGURE 3 has its dual passages in registry with the dual passages of the housing into which the rotor fits. To close the valve the rotor is then rotated to a closed position in a counterclockwise direction as indicated by the arrow through an arc of 106°. At that point the center of the liquid blocking seal 56 would register with the center of the liquid passage 18 of the valve housing. Correspondingly the center of the gas blocking seal 60 would register with the center of the gas passage 16 of the valve housing. The degree to which the rotors of any given valve would be rotated between open and closed positions is of course dependent upon the relationship of the sizes of the gas and liquid passages, the sizes of the seals used, and the overall size of the valve. Since the illustrated embodiment is of a relatively small valve, substantial rotation is required to accommodate the seals with their relative sizes as shown.

Referring again to FIGURES 1 and 2, the means for connecting the passages in the two rotors comprise a large open-end sleeve-shaped spud 64 for connecting the gas passages in the opposing rotors, and a smaller, open-end sleeve-shaped spud 66 for connecting the liquid passages in the opposite rotors. Each of the opposite end portions of the gas spud 64 is provided with a circumferential groove in which is seated an O-ring 68, and the liquid spud 66 is likewise provided with O-rings 70 seated in opposite end portion circumferential grooves. With the opposite end portions of these spuds seated in the countered portions of the respectively opposite rotors, the O-rings 68 and 70 on each spud provide a circumferential seal between the spud and the rotor body. It is noted in this connection that the seats for the O-ring seals 68 and 70 in the rotor connectors, as well as the seat 26 for the back-up O-ring seals 28, are sized to accommodate the seals with a degree of looseness in one direction so that the O-rings are free to shift slightly in their seats in response to fluid pressure exerted upon them. For example, the seat 26 for the back-up seal may be rectangular in cross-section and have a width of about 0.055 inch and a height of about 0.095 inch to accommodate an O-ring having a cross-sectional diameter of 0.070 inch. With this configuration, while the cross-section of the O-ring is somewhat compressed radially between the circumferential walls of the rotor seat 26 and chamber, it can shift slightly in its seat axially in response to pressure variation encountered to provide a better seal.

At least one end portion of both of the rotor connectors 64 and 66 must be free to separate from its seat in the rotor, so that the opposite halves of the valve may be taken apart with the rotors in place. In those instances where it is believed desirable to have one end portion of the rotor connectors fixed to a rotor, the bonding means may also serve as the seal for that end of the connectors, and the corresponding O-ring seal be omitted.

It is preferable that an additional circular groove 72 be provided on the end face of each rotor between the thrust seals and the back-up seal 28. The purpose of this seal seat 72 is to permit the use of a metallic barrier seal for those installations where it is believed that constituents of the fluids handled might harm the back-up seals. The provision of a shielding seal in the seat 72 would accordingly restrict the amount of fluid which could contact the back-up seals 28.

The opposite halves of the valve are normally held tightly together in the open position of the valve by releasable clamping means such as the bolts 74 (FIGS. 2 and 5) which pull the projecting flanges of the opposite halves of the valve toward each other. The bolts are loosened when the valve is to be moved to closed position.

The operating handle 76 is shown in outline in FIGURE 5 in its relation to the valve in both opposite positions, with details of the operating handle being illustrated in FIGURE 6. The handle is used to turn both rotors together relative to their housings. The handle comprises two members having identical outline shapes, spot welded together at selected locations and provided with a rotor engaging portion including open-end slot 78 defined at the top face by opposite flanges 80, and at the bottom face by opposite flanges 82. When the handle is inserted in the valve in the closed position, the top flanges 80 fit in the deep grooves 84 (FIGS. 1 and 5) of the top rotor 12, while the bottom flanges 82 fit in similar deep grooves in the bottom rotor. The external face of the flange 80 on one side of the slot 78 is provided with a ridge 86 extending parallel to the axis of the slot 78 and the opposite side flange 80 is provided with an outwardly-directed bump 88. One purpose of the raised ridges 86 (which are provided on both of the opposite faces of the operating handle), is to prevent the insertion of the handle in an incorrect disposition. To this end, the housing chamber rim is provided with four deep millings 90 (two on each side) to accommodate the ridge 86 and the bumps 88 when the operating handle is being inserted in the closed position of the valve. The ridges and bumps also prevent the insertion of the handle, or its removal, when the valve is an open position. The bumps and ridges may also engage and ride on the rims of the valve housings during the intermediate travel of the operating handle to ensure that the housings are pressed apart slightly and the end faces of the rotors separated from the chamber end faces. When the operating handle reaches the open position the bumps 88 are accommodated by one or the opposite of the circular depressions 92 on the rim of the valve housing. The part of the ridge 86 which had been in engagement with the rim of the housing is accommodated by one of the millings 90. It will be appreciated of course, that to obtain this camming action of the handle upon the rotors requires that the handle flanges 80 and 82 be spaced apart a distance having relatively small tolerances to ensure that both rotors are held together. Camming of the rotors away from the housings by the handle is normally only necessary under conditions where the lines leading to the valve are under a vacuum, as distinguished from the normally pressurized condition which obtains with refrigerant lines. In the case of the pressurized refrigerant lines, the pressure of the fluid against the face of the rotor will normally provide adequate lift of the rotor end face from the chamber end face to avoid heavy frictional contact between the thrust seals and the chamber face.

Another feature of the invention is best seen in FIGURE 1 in which shallow depressions 94 are formed by spot-facing selected locations of the chamber end wall. The diameter and shape of the depressions are selected to accommodate the axial thrust seals when the valve is in either of its opposite positions to reduce the chance of permanent deformation or set of the O-rings forming the thrust seals. In the open position of the valve, the two blocking thrust seals seat in these depressions 94. When the valve is operated to a closed position, only the liquid passage seal need be accommodated by one of the depressions.

With the valve construction shown, the indexing means for the opposite positions of the valve includes the arcuate slot 96 (FIGS. 5 and 6) of the operating handle which is sized so that one end of the slot bears against a clamping bolt 74 in an open position of the operating handle and the other end of the slot bears against the bolt in a closed position of the valve. It will be appreciated of course, that the cam rings 30 and 32 also serve an indexing and stop function when the bosses 40 ride up onto the opposed bosses 46 of the other ring.

Mainly for purposes of summary, the manner in which the valve functions and is operated to achieve a disconnection of the lines will be described. In its normal operation the valve has the dual passages open as shown in FIGURE 2, with the clamping bolts 74 tightened substantially so that the thrust seals about the liquid passages prevent mixing of the gas and liquid fluids passing through the valve. Without thrust seals provided for the gas passage connections at the interfaces of the rotors and housings, some leakage of the gas in the interface plane occurs. However leakage out of the chambers is prevented by the back-up seals 28, and short circuiting with the liquid passage is prevented by its seal. With the valve in the open position, the blocking thrust seals on each of the rotors is accommodated by the spot-facing depressions of the planar end face of the housing chambers. While the handle is omitted for clarity in FIGURE 2, it will be appreciated from the foregoing description that it is normally in place upon the valve (as shown in FIGURE 5) when the valve is in an open position since the interference of the protruding parts of the valve handle with the rims of the valve housings prevents its removal.

When it is desired to block the flow of refrigerant and make a disconnection (i.e. separate the valve housing halves), the bolts 74 are first loosened. With a pressurized condition in the refrigerant lines, the force therefrom will tend to separate the opposite valve housings when the bosses of the camming rings are moved away from each other during the rotation of the rotors. In other words, releasing of the clamping bolts 74 places the valve in a condition for the slight separation of the rotor end faces from the chamber end faces while the handle is being turned so that heavy frictional contact between the thrust seals and end faces of the chambers is reduced.

If the valve is used in a system in which the lines are under a vacuum, the release of the camming rings will not necessarily effect the separation of the rotor faces from the chamber faces. However the movement of the operating handle and the engagement of the protrusions thereon with the rims of the valve housings will tend to separate the valve housings slightly while retaining the rotors in tightly clamped condition. Accordingly, the heavy frictional contact is avoided in this way.

When the handle has been turned to a closed position of the valve, the bosses of the camming rings again engage each other and urge the rotors away from each other into positions in which the blocking thrust seals cover the ports of the dual passages in the valve housings. With the cam rings urging the rotors into a sealing relation with the valve housings, the clamping bolts 74 may first be removed, then the handle, and the opposite halves of the valve pulled apart with the rotor connectors 64 and 66 unseating from one or the other rotors. The maintenance may then be accomplished without the loss of refrigerant charge as would normally occur by simply breaking the lines. When the lines are to be reconnected, the halves are placed together, the handle is moved into engagement with the rotors, the bolts 74 replaced but not tightened, and the valve then turned to an open position. The bolts 74 are then tightened and the valve provides a through passage for both lines.

While during the movement of the valve between its opposite positions mixing to a slight degree of the liquid and gas may take place, this is of no appreciable consequence in a refrigeration system since the fluid is the same composition although in different states in the two passages.

The operating handle may be inserted from either side by virtue of the millings in the rim of the chamber on both sides.

It is noted that the basic structure of both the valve housings and of the opposite rotors is the same, save for being mirror images of each other. Accordingly, the advantage of commonly-shaped basic parts is provided with a valve of this character.

With the construction described, the parts of the valve which may suffer from heat are separable from the basic valve assembly so that brazing of the refrigerant lines to the valve may take place before the sealing elements are installed.

It will be appreciated that the illustrated and described embodiment is that one currently contemplated to be the best mode of carrying out the invention. However, it will be understood that substantial departures in detail and arrangement of certain of the parts shown may be made within the scope of the concept. For example, rollers and detents between the end faces of the rotors and the end faces of the chambers could be used to assure the lift of the rotor face from the valve chamber face during movement, with the means urging the rotors axially into the chamber in an open position being effected by the clamping of the bolts 74 alone. As another example, the thrust seals for placing the passages in the rotors and valve housings in communication could be recessed in the valve housing structure rather than in the rotor structure, within the contemplated scope of the invention. Other departures in such detail may also suggest themselves to those skilled in the art.

What is claimed is:
1. A dual-passage valve including:
  a pair of opposed housings adapted to be adjustably clamped together and having facing rotor chambers, each housing including a pair of passages opening into its chamber;
  a rotor in each said chamber, each rotor including a pair of passages adapted to register with, and be out of registry with, the respective housing passages in opposite open and closed positions, respectively, of said valve;
  means connecting the pairs of passages in said rotors in releasably sealed relation;
  thrust seal means in the interface plane of said housing-to-rotor passages for placing at least selected ones of the passages in sealed communication in an open position of said valve, and for blocking said housing passages at said interface plane in a closed position of said valve;
  retention means urging each of said rotors into its respective chamber;
  back-up seal means between each said rotor and housing, said back-up seal means encompassing all of said thrust seal means for preventing leakage of fluid at said thrust seal means from escaping said chambers; and
  means for rotating said rotors simultaneously between said opposite positions with said housings released from a tightly clamped position.
2. A valve according to claim 1 wherein:
  said chambers include generally planar bottoms and said rotors include generally planar end faces carrying said thrust seal means thereon, said back-up seal means being located generally at the peripheral corner of said rotors.
3. A valve according to claim 2 wherein:
  the interior face of said housing facing said end face of said rotor includes discrete recesses located on said interior face to accommodate selected inactive ones of said thrust seals in a substantially relaxed condition when said valve is both in said open and said closed positions.
4. A valve according to claim 1 wherein:
  said connecting means for said rotors includes sleeve means having opposite portions seating in the respectively opposite rotors, each opposite portion including a circumferential sealing element thereon.
5. A valve according to claim 1 wherein:
  each of said housing chambers comprises a substantially mirror image of the other; and
  each of said rotors comprises a mirror image of the other rotor.
6. A valve according to claim 1 wherein:
  said rotor rotating means includes a handle engaging both of said rotors for simultaneous rotation with said rotors being held by said handle in axially spaced relation, said handle including means adapted to engage the facing rims of said housing chambers to ensure adequate separation of said opposite housings during rotation to relieve heavy frictional contact of said thrust sealing means during said rotation.
7. A valve according to claim 6 including:
  stop means limiting the rotation of said handle to predetermined opposite locations corresponding to said opposite positions of said valve.
8. A valve according to claim 1 wherein:
  said retention means includes cam means for exerting greater axial thrust at the opposite positions of said valve than in between said opposite positions of said valve.
9. A valve according to claim 8 wherein:
  said cam means for each rotor and housing includes a substantially planar rotor ring keyed for rotation with its rotor, and a substantially planar housing ring keyed to said housing, both said rings occupying an annular space between the circumference of said rotor and said housing, said rings each including facing raised portions at selected locations for camming said rotor into said housing chamber when said raised portions engage each other.

References Cited

UNITED STATES PATENTS 2,878,829   3/1959   Folmsbee    137—625.18
2,911,008   11/1959   Du Bois    137—625.18

FOREIGN PATENTS 1,010,723   11/1965   Great Britain.

WALTER A. SCHEEL, *Primary Examiner.*

ROBERT I. SMITH, *Assistant Examiner.*

U.S. Cl. X.R.

285—37